United States Patent [19]

Scott

[11] Patent Number: 4,524,710

[45] Date of Patent: Jun. 25, 1985

[54] AUTOMATIC TRIM SYSTEM FOR HYDROFOIL CRAFT

[75] Inventor: John H. Scott, Issaquah, Wash.

[73] Assignee: The Boeing Company, Seattle, Wash.

[21] Appl. No.: 2,412

[22] Filed: Jan. 11, 1979

[51] Int. Cl.³ .............................................. B63B 1/28
[52] U.S. Cl. ................................. 114/275; 244/195;
318/588; 364/434
[58] Field of Search ............... 114/275; 244/178, 194,
244/195; 340/27 AT; 318/584–588; 364/434

[56] References Cited

U.S. PATENT DOCUMENTS 3,156,209 11/1964 Ask ........................................ 114/275
3,446,946 5/1969 Andeen ........................... 244/195 X
3,899,987 8/1975 Wright et al. ........................ 114/275

Primary Examiner—Reinhard J. Eisenzopf
Attorney, Agent, or Firm—Thomas H. Murray

[57] ABSTRACT

An automatic trim circuit for hydrofoil craft which compensates for offsets in the system due to manufacturing and assembly tolerances and wear of parts. This is achieved by integrating an error signal derived by comparison of a reference signal with an actual position signal and applying the integrated output, after amplification, to one or more servo systems which actuate the control surfaces of the hydrofoil craft.

1 Claim, 5 Drawing Figures

AUTOMATIC TRIM SYSTEM FOR HYDROFOIL CRAFT

BACKGROUND OF THE INVENTION

In a hydrofoil seacraft, the hull of the craft is lifted out of the water by means of foils which are carried on struts and usually pass through the water beneath the surface thereof. In passing through the water, and assuming that sufficient speed is attained, the foils create enough lift to raise the hull above the surface and, hence, eliminate the normal resistance encountered by a ship hull in passing through the water.

In the usual case, there are forward and aft foils both provided with control flaps similar to those used on aircraft, although in some cases the entire foils may be rotatable and used as control surfaces. The other essential control element is the rudder which pierces or is submerged beneath the surface of the water and may be either forward or aft of the craft, depending on its design. In most hydrofoils, the flaps or control surfaces are used primarily to cause the craft to ascend or descend and to control the craft about its pitch and roll axes; however, they can also be used in combination with the rudder to bank the ship about its roll axis during a turn. The flaps are also used to stabilize the craft during movement on water, so that pitching or rolling motions can be minimized by proper counterbalancing movement of the flaps. A control system of this type is disclosed and claimed, for example, in Stark et al U.S. Pat. No. 3,886,884 issued June 3, 1975 and assigned to the Assignee of the present application. The invention described herein is particularly useful in a system of the type described in the aforesaid patent; although its usefulness is not necessarily restricted to that particular system.

In the operation of hydrofoils such as that shown in the aforesaid U.S. Pat. No. 3,886,884, it has been found that good dynamic height and pitch control can be achieved, provided that the accumulation of manufacturing and assembly tolerance variations (depicted as "offsets") are relatively small. That is, if the manufacturing and assembly tolerances do not materially vary from the expected values, the system will function without any modification in accordance with theoretical parameters In actual practice, however, the tolerance variations are such that fixed biases must be applied to the hydrofoil control flap actuators in order to compensate for actual tolerance variations and achieve satisfactory height and pitch control. Determining the necessary values of the biases, however, is an involved and expensive procedure. This expense can be absorbed if the adjustments required are infrequent. However, in actual practice, parts replacement, wear and/or other causes result in the necessity for frequent adjustments with the result that the adjustment expense becomes a real burden.

SUMMARY OF THE INVENTION

In accordance with the present invention, pitch trim and height trim circuit means are incorporated into the control system for a hydrofoil craft to continuously provide corrections to bias signals applied to the hydrofoil control flap surfaces, thereby automatically compensating for aging, wear, parts replacement and other changes in offsets which alter the operational characteristics of the height and pitch control features of the system. The means for compensating comprises means for integrating the height comparison and pitch comparison signals and for superimposing the integrated signals on the fixed biases applied to the forward and aft foil servo systems of the craft to thereby automatically compensate for variations from the expected height and pitch comparison signals due to wear, replacement of parts and other factors.

The above and other objects and features of the invention will become apparent from the following detailed description taken in connection with the accompanying drawings which form a part of this specification, and in which.

Figure 1:
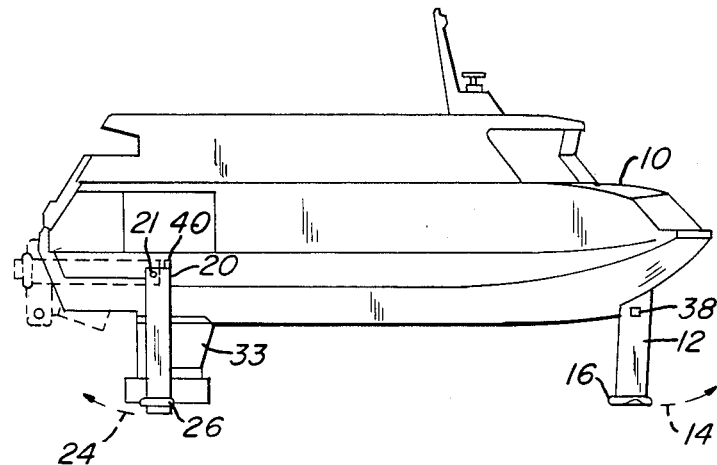
FIG. 1 is a side view of a typical hydrofoil craft with which the control system of the invention can be used.
Figure 2:
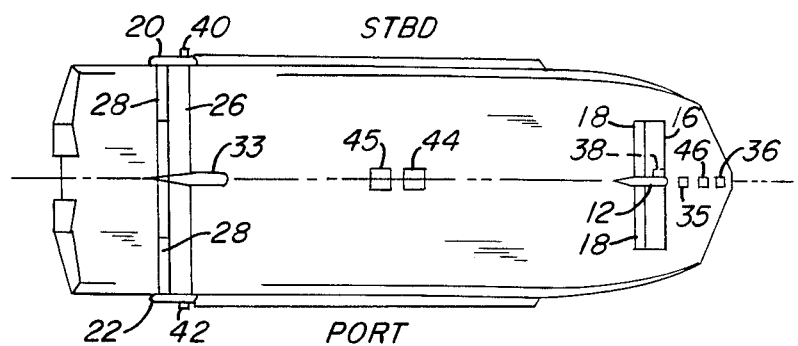
FIG. 2 is a bottom view of the craft shown in FIG. 1.

With reference now to the drawings, and particularly to FIGS. 1 and 2, the hydrofoil shown includes a conventional hull 10 which can be provided with a propeller or the like and an inboard motor such that it can traverse the surface of water as a conventional displacement ship. Alternatively, the propulsion system used to power the craft when it is foil-borne can also be used when the craft is hull-borne. Pivotally connected to the hull is a forward swiveled strut or rudder 12 which is rotatable about a vertical axis in order to steer the craft in the foil-borne mode of operation. The rudder 12 can also be swiveled upwardly in the direction of arrow 14 to clear the surface of the water when the craft is operating as a conventional displacement ship. Carried on the lower end of the rudder 12 is a forward foil 16 (FIG. 2) which carries at its trailing edge control surfaces or flaps 18 which are interconnected and operate in synchronism. Alternatively, the entire forward foil 16 can be rotated for control. Thus, there is a single forward control surface which may be either a flap or the entire foil.

In the aft portion of the craft, struts 20 and 22 are pivotally connected to the hull 10 about an axis 21 (FIG. 1). The struts 20 and 22 can be rotated downwardly into the solid-line position shown in FIG. 1 for foil-borne operation, or can be rotated backwardly in the direction of arrow 24 and into the broken-line position shown when the craft operates as a conventional displacement ship. Extending between the lower ends of the struts 20 and 22 is an aft foil 26 which carries at its trailing edge starboard and port flaps 28. In actual practice, and as described in U.S. Pat. No. 3,886,884, there are actually two starboard flaps and two port flaps which operate in the redundant mode. For purposes of the present invention, however, it is important to note that in order to bank the craft about its roll axis, for example, the starboard flap will be rotated in a direction opposite that of the port flap. In order to compensate for movements of the craft about its pitch axis, the forward flap 18 is rotated in a direction opposite to the rear flaps 28. In order to cause the craft to ascend or descend on the foils 16 and 26, the forward flap 18 and, for some crafts, the rear flaps 28 are rotated in the same direction.

Carried between the struts 20 and 22 and pivotally connected to the hull 10 about axis 21 is a gas turbine waterjet propulsion system 33 which provides the forward thrust for the craft during foil-borne operation. It should be understood, however, that other types of thrust producing devices can be used in accordance with the invention.

With the rudder 12 and struts 20 and 22 retracted, the craft may operate in the hull-borne mode. In the foil-borne mode of operation, both the rudder 12 and struts 20 and 22 are rotated downwardly into the solid-line position shown in FIG. 1 and are locked in position. In order to become foil-borne, the pilot sets the desired foil depth in a manner hereinafter described and the throttles are advanced. The craft, therefore, will accelerate and the hull will clear the water and continue to rise until it stabilizes at the command foil depth. A normal landing procedure is to simply reduce the throttle setting, allowing the ship to settle to the hull as the speed decays.

Mounted on the hull, as shown in FIG. 2, are sensors for producing electrical signals indicative of craft motion. Thus, at the bow of the craft is a height sensor 36 which produces an electrical signal proportional to the height of the bow above the surface of the water during foil-borne operation. Also at the bow of the ship is a forward vertical accelerometer 35 which produces an electrical signal proportional to vertical acceleration. Mounted on the rudder 12 is a lateral accelerometer 38 which produces an electrical signal proportional to the lateral or sideways acceleration of the craft. Mounted on the top of the starboard strut 2Q is an aft starboard vertical accelerometer 40, and mounted on the top of the port strut 22 is an aft port vertical accelerometer 42. Means are also provide for sensing motion of the craft about its pitch and roll axes. In this respect, two vertical gyros 44 and 45 are mounted on the craft and produce signals proportional to the angle of the craft with respect to vertical about its pitch and roll axes. The devices 44 and 45 are preferably identical and normally produce substantially identical signals. Finally, a yaw rate gyro 46 is provided. The accelerometers and gyros as described will thus sense motions of the craft about its roll, pitch and yaw axes.

The present invention is concerned only with the gyros 44 and 45 for sensing the angle of the craft with respect to vertical about its pitch axis and the height sensor 36. For a description of the operation of the remaining sensors and the control system to which they are connected, reference may be had to the aforesaid U.S. Pat. No. 3,886,884 for a full and detailed description.

With the arrangement shown, any movement about the pitch axis of the craft will be sensed by the vertical gyros 44 and 45; and the height of the craft above the surface of the water will be sensed by the height sensor 36. In the normal control mode of the hydrofoil, the change of height of the hull above the water is controlled primarily by the forward flap 18. In order to raise the hull while foil-borne, the forward flap is rotated downwardly, thereby increasing the lift afforded by the forward foil 16 and causing the hull to elevate out of the water. However, in order to eliminate or minimize pitching motions about the pitch axis, both the forward and aft control surfaces are employed. However, the forward and aft surfaces operate in opposite directions to correct any pitch condition.

Figure 3:
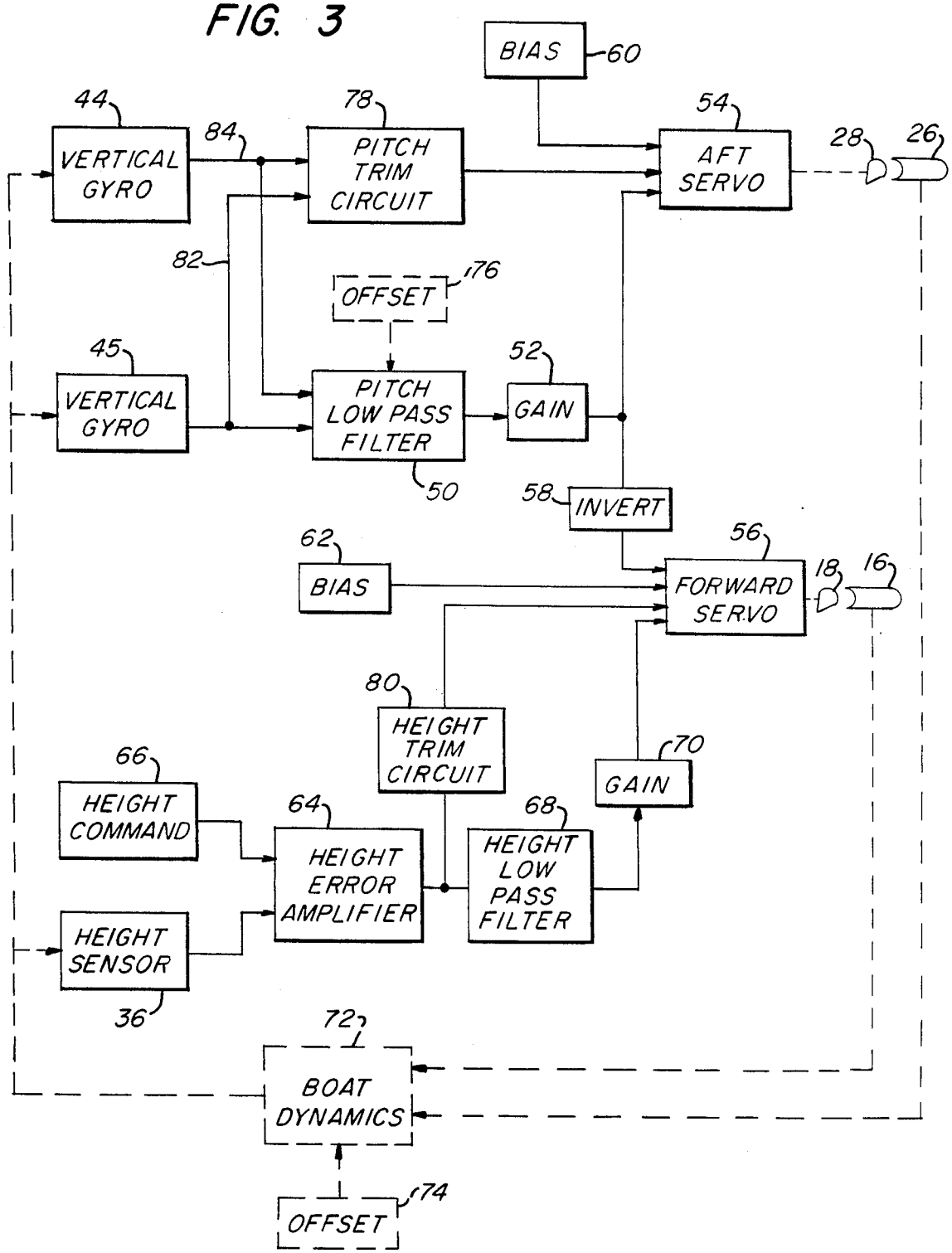
FIG. 3 is a block schematic diagram showing in general outline the normal height control and pitch compensating systems for the hydrofoil craft of FIGS. 1 and 2 and incorporating the trim circuits of the invention.

A partial schematic block diagram of the control system for the hydrofoil of FIGS. 1 and 2, with which the present invention is concerned, is shown in FIG. 3. The vertical gyros 44 and 45 are both connected to the input of a pitch low-pass filter 50 connected through an amplifier or gain circuit 52 to both an aft servo system 54 and a forward servo system 56; however it will be noted that the output of the gain circuit 52 is inverted in inverter 58 before being applied to the forward servo 56. In this manner, and in order to compensate for pitch motions, the flaps or control surfaces 18 and 28 are rotated in opposite directions as explained above.

The height sensor 36, also shown in FIG. 2, is connected to a height error amplifier 64 where it is compared with a height command signal from source 66. The signal from height command source 66 is determined by the operator of the hydrofoil, the arrangement being such that once the height command is established, and assuming that the craft is foil-borne with the throttle advanced, an error signal will be produced at the output of amplifier 64 from comparison of the signals from source 66 and height sensor 36 until the desired height is achieved; whereupon the output of the height error amplifier 64 will be zero. The output of the height error amplifier 64 is applied through- height low-pass filter 68 and amplifier or gain circuit 70 to the forward servo 56 which, in turn, controls the control surface or flap 18 on the forward foil 16.

The system shown in FIG. 3, of course, is a complete servo system wherein any movement of the flaps 18 and 28 will effect a change in the boat dynamics, schematically illustrated at 72 in FIG. 3. This change in boat dynamics, in turn, will alter the outputs of the height sensor 36 and the vertical gyros 44 and 45. It will be understood, of course, that there is no actual connection between the foils 16 and 28 and the elements 36, 44 and 45. However, when flap 18, for example, causes the craft to ascend, this change in height will be sensed by the sensor 36, causing an output to occur from amplifier 64. This output, in turn, will vary the position of flap 18 until the signals from sources 36 and 66 are again equal, indicating that the craft has reached the desired or command height; whereupon the output from amplifier 64 will drop to zero and no further correction will be effected by the flap 18. Variations in the flaps 18 and 28 will, likewise, cause variations at the outputs of vertical gyros 44 and 45.

As was explained above, a control system such as that shown in FIG. 3 can provide good dynamic pitch and height control of the craft and also provide adequate static control provided that the accumulation of manufacturing and assembly tolerances, depicted as offsets in FIG. 3, are suitably small. Actually, there are many offset sources; however the critical ones are lumped together as offsets 74 and 76 in FIG. 3. When conditions are such that the offsets 74 and 76, representing departures from the theoretical modes of operation, are constant and can be determined by one means or another, the bias sources 60 and 62 can be adjusted to reduce the effects of the offsets to acceptable levels. Determining the necessary values of biases 60 and 62, however, is involved and expensive in both labor and loss of boat revenue service during the adjustment process. For that matter, in most cases, the required biases 60 and 62 can be determined only by actual operation of the craft in the water. As the craft traverses the water, adjustments are made in the biases 60 and 62 until the desired mode of operation of the craft is achieved. Even after the biases 60 and 62 are set in this manner, however, replacement of parts, wear and/or other causes may result in the necessity for frequent adjustments of the two bias sources 60 and 62, which cannot be tolerated.

In accordance with the present invention, therefore, a pitch trim circuit 78 and a height trim circuit 80 are provided for automatically compensating for changes in the offsets 74 and 76. Circuits 78 and 80 continually provide corrections to the bias signals from sources 60 and 62 and thereby automatically compensate for aging, wear, parts replacement and other changes in the offsets 74 and 76. Again, it will be appreciated that the offsets 74 and 76 are not actual circuit components in the circuit of FIG. 3 but rather represent variations in the system due to tolerance variations and the like which cause it to depart from the desired theoretical mode of operation.

Figure 4:
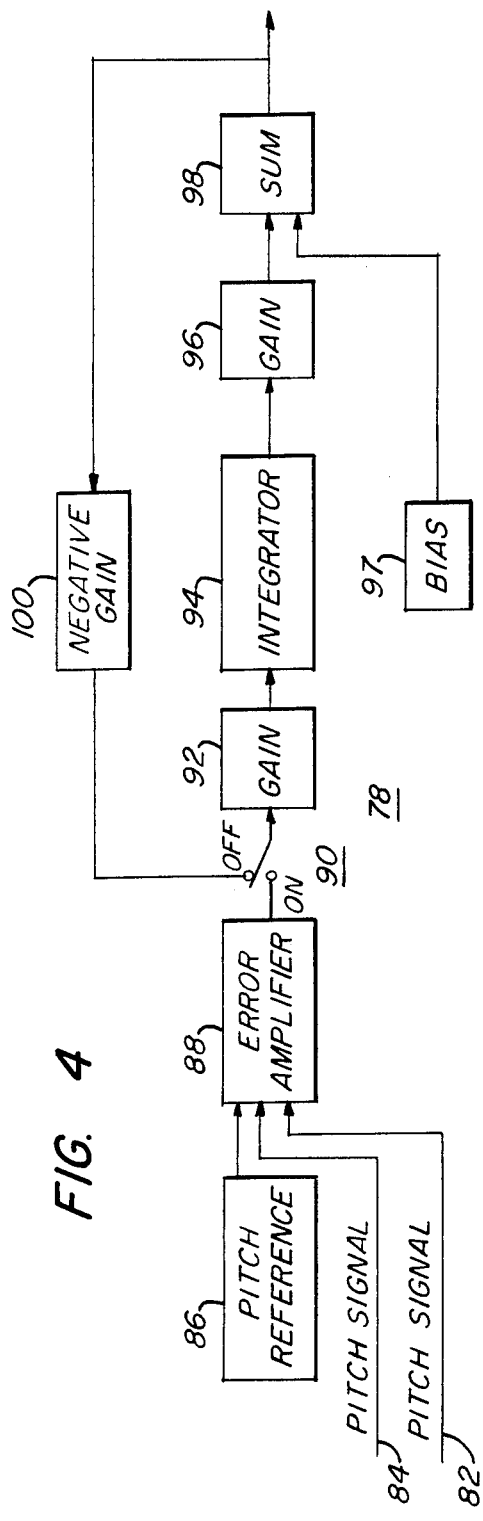
FIG. 4 is a block schematic circuit diagram of the pitch trim circuitry of the invention.

Details of the pitch trim circuit 78 are shown in FIG. 4. The pitch signals on leads 82 and 84 from gyros 44 and 45 shown in FIG. 3 are averaged and then differenced with a pitch reference signal from source 86 in error amplifier 88. The pitch reference signal from source 86 is a constant value determined by design considerations in most cases but could be varied as a function of boat speed or some other parameter to fit differing requirements. The output of the error amplifier 88, referred to as a comparison signal, comprises the difference between the averaged pitch signals on leads 82 and 84 and the pitch reference signal from source 86. The composition signal is then applied through the normally-closed contacts of a switch 90 to amplifier or gain circuit 92. In circuit 92, the comparison signal is amplified and then integrated with respect to time in integrator 94. The output of the integrator, therefore, is a signal whose average value is a function of the difference between the averaged pitch signals from gyros 44 and 45 and the pitch reference signal 86, this being an indication of the offset due to wear, parts replacement and other factors. The output of the integrator 94 is then amplified in gain circuit 96 and applied to a summing circuit 98 where it is summed with a bias control signal from source 97. The product of the gains effected by circuits 92 and 96 must be much smaller than the gain effected by circuit 52 of FIG. 3 to avoid dynamic performance degradation. At the same time, the product must be large enough to permit the integrator 94 to compensate for any slowly time-varying offset.

The integrator 94 normally has symmetric, or nearly symmetric, maximum output limits as part of its physical design. Thus, the integrator 94 cannot output a signal with a magnitude greater than a given level even if the integrator itself fails. The amplifiers 92, 96 and summing circuit 98 have similar maximum output limits. Distributing the product of the gains effected by circuits 92 and 96 permits the physical limits of the integrator 94 (i.e., maximum and minimum values) to be scaled to any required functional signal authority limit. The bias control signal from source 97 permits, by proper selection of value, either symmetric or asymmetric signal limits above and below the null level.

The output of the summing circuit 98, referred to as a summing signal is also connected to circuit 100, having a negative gain, which can be connected to the input of gain circuit 92 through switch 90. The gain circuit 100 is selected such that the product of the gains effected by circuits 92, 96 and 100 is large and negative. Thus, when switch 90 is placed in a position to connect gain circuit 100 to the input of gain circuit 92, the output signal of circuit 98, referred to as a summing signal will rapidly diminish to a zero level, thereby turning the circuit OFF. However, it can be readily turned back ON by reversing the position of switch 90.

In summary, the pitch trim circuit 78, when connected to the output of error amplifier 88, provides an input signal to the servo system 54 of FIG. 3 which will continually increase in magnitude until such time that the output of the error amplifier 88 is zero or when the authority limit is reached as determined by integrator circuit 94. When switch 90 connects gain circuit 100 to the input of summing circuit 98, the signal to the servo 54 of FIG. 3 rapidly reduces in magnitude to a zero value and remains at this value until the circuit is once again turned ON.

Figure 5:
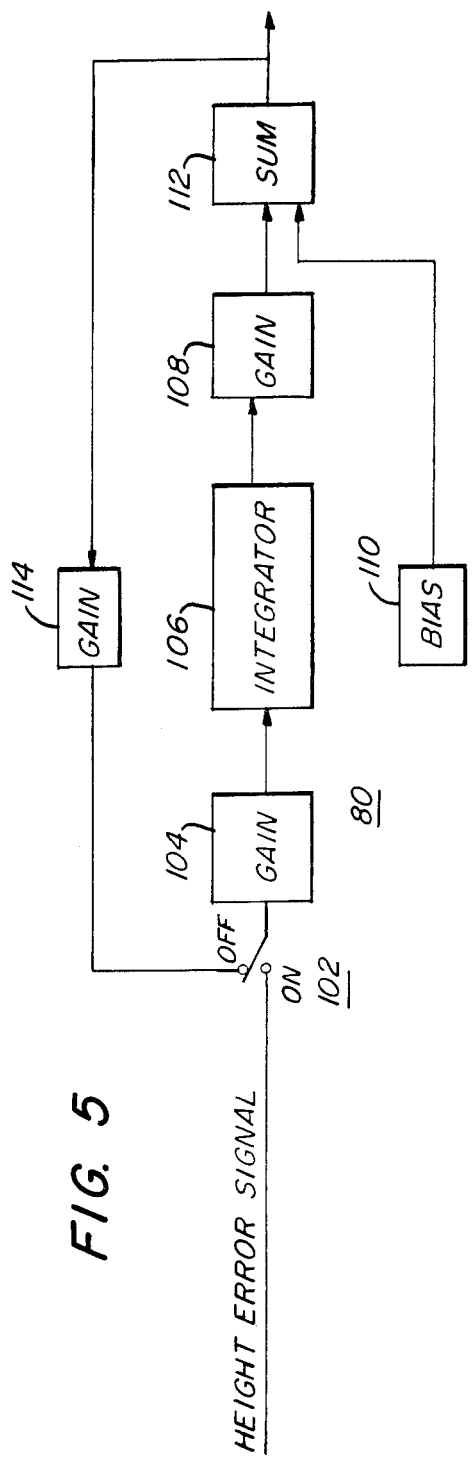
FIG. 5 is a block schematic circuit diagram of the height trim circuitry of the invention.

In FIG. 5, details of the height trim circuit 80 are shown; and it will be noted that it is similar to the pitch trim circuit just described. Applied to the input of the height trim circuit 80 is the height error signal also referred to as height comparison signal, derived from height error amplifier 64 by comparison of the height sensor signal from circuit 36 with the height command signal from circuit 66. This height comparison signal is applied through a switch 102 to a gain circuit 104 and thence to an integrator 106. The output of the integrator 106, like integrator 94 of FIG. 4, is applied to a gain circuit 108 and a summing circuit 112. Also applied to circuit 112 is a bias control signal from source 110 which establishes the upper and lower signal limits at the output of summing circuit 112. As in the pitch trim circuit of FIG. 4, the output of summing circuit 112 can be applied through a negative gain circuit 114 and through switch 102 to the input of gain circuit 104 to cause the output of the height trim circuit to rapidly diminish to zero. Again, the product of the gains effected by circuits 104 and 108 must be much less than the gain effected by circuit 70 of FIG. 3, and this product is distributed between gains 104 and 108 to provide a suitable integrator 106 authority limit.

In the use of the invention, the bias signals from sources 60 and 62 (FIG. 3) are selected to represent the expected requirements for correcting any offsets 74 and 76. The pitch trim circuit 78 and the height trim circuit 80 authority limits are then set high enough to accommodate the anticipated offset variations but not so large as to compensate for other system failures which must be corrected by other means. The switch 90 and 102 of FIGS. 4 and 5 are preferably ganged together so that during conditions where automatic trim is not desired, such as during take-off, the trim circuits 78 and 80 are disabled. The corrections effected by the pitch trim circuits 78 and 80 are sufficiently slow acting to insure that they will not interfere with the other dynamic characteristics of the craft.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a control system for a hydrofoil craft of the type in which a servo system for a control surface on a submerged foil is varied by an error signal derived by comparison of a reference signal with an actual position signal, and wherein said control system is subject to an offset from theoretical control parameters due to manufacturing tolerances of parts and wear, and wherein a bias signal is supplied to compensate for said offset, the combination of means for automatically establishing said bias signal including: means for comparing a hydrofoil craft responsive signal with a reference signal to generate a comparison signal; means for integrating said comparison signal between maximum and minimum values to generate an integrated signal, first amplifying means for amplifying said comparison signal before it is applied to said integrating means, second amplifying means for amplifying the output of said integrating means, summing means for summing the output of said second amplifying means with a control signal, an amplifier with negative gain adapted to apply a signal proportional to the output of said summing means to the input of said first amplifying means whereby, when said output is connected through said first amplifying means with negative gain to the input of said integrating means, the output of said summing means will rapidly drop to zero, and means for varying said bias signal as a function of the magnitude of said integrated signal.

* * * * *